US009262718B2

(12) United States Patent
Meyerhofer et al.

(10) Patent No.: US 9,262,718 B2
(45) Date of Patent: Feb. 16, 2016

(54) SYSTEMS AND METHODS TO PREDICT A REDUCTION OF ENERGY CONSUMPTION

(71) Applicant: General Electric Company, Schenectady, NY (US)

(72) Inventors: Mark Joseph Meyerhofer, Acworth, GA (US); James Joseph Schmid, Acworth, GA (US); Jerry Steven Massey, Lawrenceville, GA (US); Bobby Antione Wilson, Lithia Springs, GA (US); Anthony Steven McCulley, Stone Mountain, GA (US); Jaime Alberto Sierra, Atlanta, GA (US); Sthitaprajna Acharya, Alpharetta, GA (US)

(73) Assignee: General Electric Company, Schenectady, NY (US)

( * ) Notice: Subject to any disclaimer, the term of this patent is extended or adjusted under 35 U.S.C. 154(b) by 0 days.

(21) Appl. No.: 14/622,389

(22) Filed: Feb. 13, 2015

(65) Prior Publication Data
US 2015/0154499 A1 Jun. 4, 2015

Related U.S. Application Data

(63) Continuation of application No. 13/283,475, filed on Oct. 27, 2011, now Pat. No. 8,972,071.

(51) Int. Cl.
*G05D 11/00* (2006.01)
*G06N 5/04* (2006.01)
(Continued)

(52) U.S. Cl.
CPC *G06N 5/04* (2013.01); *G05B 15/02* (2013.01); *G05F 1/66* (2013.01); *G06Q 10/04* (2013.01); *H02J 3/14* (2013.01); *Y02B 70/3225* (2013.01); *Y04S 20/222* (2013.01)

(58) Field of Classification Search
CPC .......... G06F 1/66; G05B 15/02; G06Q 10/04; H02J 3/14; Y02B 70/3225; Y04S 20/222
USPC .................................................. 700/291, 295
See application file for complete search history.

(56) References Cited

U.S. PATENT DOCUMENTS 3,678,284 A 7/1972 Peters
3,872,286 A 3/1975 Putman
(Continued)

OTHER PUBLICATIONS

Kok et al., "PowerMatcher: Multiagent Control in the Electricity Infrastructure", AAMAS 2005, pp. 75-82.
(Continued)

*Primary Examiner* — Kenneth M Lo
*Assistant Examiner* — Chad Rapp
(74) *Attorney, Agent, or Firm* — Armstrong Teasdale LLP

(57) ABSTRACT

A computing device for use with a demand response system is provided. The computing device includes a communication interface for receiving customer data of a plurality of customers, wherein the customer data includes a participation history and historical consumption values for each customer for participating in at least one demand response event. A processor is coupled to the communication interface and is programmed to select at least one customer from the plurality of customers by considering the participation history and the historical consumption values for each of the customers. The processor is also programmed to estimate a future reduction in energy consumption for the customer based on the customer data and to determine whether the estimated future reduction in energy consumption is substantially accurate.

19 Claims, 3 Drawing Sheets

(51) Int. Cl.
*G06Q 10/04* (2012.01)
*G05B 15/02* (2006.01)
*G05F 1/66* (2006.01)
*H02J 3/14* (2006.01)

(56) References Cited

U.S. PATENT DOCUMENTS

| | | | |
|---|---|---|---|
| 3,906,242 A | 9/1975 | Stevenson | |
| 3,925,680 A | 12/1975 | Dixon | |
| 3,995,686 A | 12/1976 | Laube | |
| 4,031,406 A | 6/1977 | Leyde et al. | |
| 4,059,747 A | 11/1977 | Brody | |
| 4,100,426 A | 7/1978 | Baranowski et al. | |
| 4,117,537 A | 9/1978 | Muench | |
| 4,125,782 A | 11/1978 | Pollnow, Jr. | |
| 4,181,950 A | 1/1980 | Carter, II | |
| 4,197,468 A | 4/1980 | Reid, Jr. | |
| 4,310,770 A | 1/1982 | Keener et al. | |
| 4,382,284 A | 5/1983 | Dressel et al. | |
| 4,804,938 A | 2/1989 | Rouse et al. | |
| 4,847,781 A | 7/1989 | Brown, III et al. | |
| 5,311,562 A | 5/1994 | Palusamy et al. | |
| 5,381,462 A | 1/1995 | Larson et al. | |
| 5,483,468 A | 1/1996 | Chen et al. | |
| 5,687,139 A | 11/1997 | Budney | |
| 6,018,690 A | 1/2000 | Saito et al. | |
| 6,054,984 A | 4/2000 | Alexander | |
| 6,064,420 A | 5/2000 | Harrison et al. | |
| 6,078,785 A | 6/2000 | Bush | |
| 6,098,050 A | 8/2000 | Knoblock et al. | |
| 6,138,461 A | 10/2000 | Park et al. | |
| 6,380,947 B1 | 4/2002 | Stead | |
| 6,528,957 B1 | 3/2003 | Luchaco | |
| 6,570,592 B1 | 5/2003 | Sajdak et al. | |
| 6,697,951 B1 | 2/2004 | Sinha et al. | |
| 6,810,516 B2 | 10/2004 | Lauris | |
| 6,900,738 B2 | 5/2005 | Crichlow | |
| 6,909,942 B2 | 6/2005 | Andarawis et al. | |
| 7,019,496 B1 | 3/2006 | Garretson | |
| 7,039,532 B2 | 5/2006 | Hunter | |
| 7,123,994 B2 | 10/2006 | Weik et al. | |
| 7,181,320 B2 | 2/2007 | Whiffen et al. | |
| 7,206,670 B2 | 4/2007 | Pimputkar et al. | |
| 7,274,305 B1 | 9/2007 | Luttrell | |
| 7,310,620 B2 | 12/2007 | Moore et al. | |
| 7,333,982 B2 | 2/2008 | Bakalash et al. | |
| 7,373,221 B2 | 5/2008 | Lal et al. | |
| 7,373,222 B1 | 5/2008 | Wright et al. | |
| 7,392,115 B2 | 6/2008 | Schindler | |
| 7,469,190 B2 | 12/2008 | Bickel | |
| 7,561,681 B2 | 7/2009 | Booth et al. | |
| 7,565,227 B2 | 7/2009 | Richard et al. | |
| 7,653,443 B2 | 1/2010 | Flohr | |
| 7,660,649 B1 | 2/2010 | Hope et al. | |
| 7,715,951 B2 | 5/2010 | Forbes, Jr. et al. | |
| 7,743,001 B1 | 6/2010 | Vermeulen et al. | |
| 7,778,738 B2 | 8/2010 | Taft | |
| 7,885,917 B2 | 2/2011 | Kuhns et al. | |
| 7,945,466 B2 | 5/2011 | Klett et al. | |
| 7,962,248 B2 | 6/2011 | Flohr | |
| 8,219,258 B1 | 7/2012 | Almeida et al. | |
| 8,872,379 B2 | 10/2014 | Ruiz et al. | |
| 8,972,071 B2* | 3/2015 | Meyerhofer et al. | 700/291 |
| 8,972,467 B2 | 3/2015 | Heinrich et al. | |
| 2001/0010032 A1 | 7/2001 | Ehlers et al. | |
| 2001/0014976 A1 | 8/2001 | Roop et al. | |
| 2001/0034236 A1 | 10/2001 | Tong et al. | |
| 2002/0002509 A1 | 1/2002 | Wagorn et al. | |
| 2002/0072868 A1 | 6/2002 | Bartone et al. | |
| 2003/0125843 A1 | 7/2003 | Prasad | |
| 2003/0167178 A1 | 9/2003 | Jarman et al. | |
| 2004/0075343 A1 | 4/2004 | Wareham et al. | |
| 2004/0088083 A1 | 5/2004 | Davis et al. | |
| 2004/0107259 A1 | 6/2004 | Wallace et al. | |
| 2005/0154499 A1 | 7/2005 | Aldridge et al. | |
| 2005/0165511 A1 | 7/2005 | Fairlie | |
| 2005/0240668 A1 | 10/2005 | Rolia et al. | |
| 2006/0042846 A1 | 3/2006 | Kojori et al. | |
| 2006/0125422 A1 | 6/2006 | Costa | |
| 2006/0143483 A1* | 6/2006 | Liebenow | 713/300 |
| 2007/0177319 A1 | 8/2007 | Hirst | |
| 2007/0260359 A1 | 11/2007 | Benson et al. | |
| 2008/0167756 A1 | 7/2008 | Golden et al. | |
| 2008/0177678 A1 | 7/2008 | Di Martini et al. | |
| 2009/0018706 A1* | 1/2009 | Wittner | 700/295 |
| 2009/0187499 A1 | 7/2009 | Mulder et al. | |
| 2009/0194601 A1 | 8/2009 | Flohr | |
| 2009/0240964 A1 | 9/2009 | Pfeiffer | |
| 2009/0256686 A1 | 10/2009 | Abbot et al. | |
| 2009/0295594 A1 | 12/2009 | Yoon | |
| 2009/0326726 A1 | 12/2009 | Ippolito et al. | |
| 2010/0017045 A1 | 1/2010 | Nesler et al. | |
| 2010/0088261 A1 | 4/2010 | Montalvo | |
| 2010/0107173 A1 | 4/2010 | Chassin | |
| 2010/0138065 A1 | 6/2010 | Taft | |
| 2010/0145540 A1 | 6/2010 | Mckenna | |
| 2010/0179704 A1 | 7/2010 | Ozog | |
| 2010/0179862 A1 | 7/2010 | Chassin et al. | |
| 2010/0217550 A1 | 8/2010 | Crabtree et al. | |
| 2010/0286937 A1 | 11/2010 | Hedley et al. | |
| 2010/0332373 A1 | 12/2010 | Crabtree et al. | |
| 2011/0125542 A1 | 5/2011 | Koch | |
| 2011/0138198 A1 | 6/2011 | Boss et al. | |
| 2011/0153106 A1 | 6/2011 | Drake et al. | |
| 2011/0196546 A1 | 8/2011 | Muller et al. | |
| 2011/0202217 A1 | 8/2011 | Kempton | |
| 2011/0258018 A1 | 10/2011 | Tyagi et al. | |
| 2012/0004786 A1 | 1/2012 | Lo et al. | |
| 2012/0022709 A1 | 1/2012 | Taylor | |
| 2012/0116600 A1 | 5/2012 | Schmid et al. | |
| 2012/0130556 A1 | 5/2012 | Marhoefer | |
| 2012/0136496 A1 | 5/2012 | Black et al. | |
| 2012/0310860 A1 | 12/2012 | Kim et al. | |
| 2012/0316688 A1 | 12/2012 | Boardman et al. | |
| 2012/0323393 A1 | 12/2012 | Imhof et al. | |
| 2013/0035883 A1 | 2/2013 | San Andres et al. | |
| 2013/0254151 A1 | 9/2013 | Mohagheghi et al. | |
| 2014/0062195 A1 | 3/2014 | Bruschi et al. | |

OTHER PUBLICATIONS

Tsikalakis et al., "Centralized Control for Optimizing Microgrids Operation", IEEE, Jul. 24-29, 2011, pp. 1-8.

Kok et al., "PowerMatcher: Multiagent Control in the Electricity Infrastructure", IEEE, 2005, pp. 75-82.

Ilic, M.D., "From Hierarchical to Open Access Electric Power System", IEEE, 2007, pp. 1060-1084.

* cited by examiner

SYSTEMS AND METHODS TO PREDICT A REDUCTION OF ENERGY CONSUMPTION

CROSS REFERENCE TO RELATED APPLICATIONS

This application is a continuation application of U.S. patent application Ser. No. 13/283,475, filed Oct. 27, 2011, entitled "SYSTEMS AND METHODS TO PREDICT A REDUCTION OF ENERGY CONSUMPTION", the disclosure of which are hereby incorporated herein by reference in its entirety.

BACKGROUND OF THE INVENTION

The field of the invention relates generally to demand response systems and, more particularly, to a computing device for use with a demand response system that enables utilities to predict a reduction of energy consumption by their customers.

As the human population increases around the world and with an increase in the use of electric vehicles by customers, energy demand will also likely increase. More specifically, energy demand will likely increase in the form of electrical energy used to power buildings, homes, and/or to charge batteries or other energy sources used in electric vehicles. Moreover, the demand on the power grid is likely to increase while the demand for fuel decreases. Such demands will likely cause an increase in the price of energy from the power grid. In particular, the price of energy is likely to increase during peak times, such as a time of day and/or a day of the week, when demand for energy is high.

Currently, at least some known utilities use demand response systems that enable customers to enroll in at least one demand response program to manage the consumption of energy by their customers in response to supply conditions. Examples of demand response programs include a direct control program, a peak pricing program, such as a critical peak pricing program, and a time of use program. The initiation and/or implementation of a demand response program by a utility is known as a demand response event. A demand response event is initiated by a utility transmitting a plurality of signals to its customers. For example, a demand response event representative of a direct load control program, is initiated when the utility transmits a signal to a device within a building, such as an in-home smart device and/or smart thermostat, such that the utility is enabled to directly control the usage of energy consuming machines within the building. A demand response event representative of a critical peak pricing program occurs when the utility transmits pricing signals to its customers during peak demand times. The pricing signals enable the utility to apprise customers of heightened energy prices during peak demand time periods such that customers may limit their energy consumption during such peak demand time periods. A demand response event representative of a time of use program occurs when the utility transmits a signal to a customer that is representative of energy prices that correspond to a time range such that the customer may identify an optimal time of day and/or day of the week to consume energy to ensure a low energy price rate.

Such demand response systems enable the utility to manage peak load conditions and to reduce energy demand among its customers. More specifically, utilities have customers enroll in demand response programs to manage peak load conditions by having each customer receive a fixed number of demand response events per day, week, and/or month. However, current demand response systems are not configured to enable a utility to monitor the reduction in energy consumption by customers in order to accurately predict the future reduction of energy consumption by each customer based on demand response events that each customer may participate in. An accurate estimate for a potential load reduction that is based on implementing demand response programs is critical information for a utility to have in managing demand response events. Utilities may endure detrimental economic implications if the reduction of energy consumption caused by a demand response event is greater than or less than expected. For example, if estimates of a reduction in energy consumption by customers are not substantially accurate, then utilities may not schedule enough demand response events for their customers. Alternatively, utilities may schedule too many events by transmitting signals to all their customers, even the customers who may not necessarily participate in an event. Both aforementioned scenarios may cause a utility to lose revenue. Customers may also be upset when there is an overutilization and/or underutilization of demand response events.

BRIEF DESCRIPTION OF THE INVENTION

In one embodiment, a computing device for use with a demand response system is provided. The computing device includes a communication interface for receiving customer data of a plurality of customers, wherein the customer data includes a participation history and historical consumption values for each customer for participating in at least one demand response event. A processor is coupled to the communication interface and is programmed to select at least one customer from the plurality of customers by considering the participation history and the historical consumption values for each of the customers. The processor is also programmed to estimate a future reduction in energy consumption for the customer based on the customer data and to determine whether the estimated future reduction in energy consumption is substantially accurate.

In another embodiment, a demand response system is provided. The demand response system includes a data management system that includes a database that includes customer data of a plurality of customers, wherein the customer data includes a participation history and historical consumption values for each customer for participating in at least one demand response event. The demand response system also includes a computing device coupled to the data management system. The computing device includes a communication interface that receives the customer data. A processor is coupled to the communication interface and is programmed to select at least one customer from the plurality of customers by considering the participation history and the historical consumption values for each of the customers. The processor is also programmed to estimate a future reduction in energy consumption for the customer based on the customer data and to determine whether the estimated future reduction in energy consumption is substantially accurate.

In yet another embodiment, a method for monitoring the reduction of energy consumption is provided. Customer data of a plurality of customers is received by a communication interface. The customer data includes a participation history and historical consumption values for each customer for participating in at least one demand response event. At least one customer from the plurality of customers is selected via a processor by considering the participation history and the historical consumption values for each of the customers. A future reduction in energy consumption for the customer is estimated, via the processor, based on the customer data.

Whether the estimated future reduction in energy consumption is substantially accurate is also determined via the processor.

DETAILED DESCRIPTION OF THE INVENTION

The exemplary systems and methods described herein overcome at least some known disadvantages of known demand response systems by enabling a utility to predict the reduction of energy consumption by its customers. The embodiments described herein include a demand response system that includes a computing device, wherein the computing device includes a communication interface for receiving customer data of a plurality of customers. The customer data includes a participation history and historical consumption values for each customer for participating in at least one demand response event, wherein the demand response event facilitates a reduction in energy consumption for the customers. A processor is coupled to the communication interface and is programmed to select at least one customer from the plurality of customers by considering the participation history and the historical consumption values for each of the customers. The processor is also programmed to estimate a future reduction in energy consumption for the customer based on the customer data and to determine whether the estimated future reduction in energy consumption is substantially accurate and make adjustments to be more accurate. By being able to accurately predict a future reduction in energy consumption by its customers, the utility can effectively manage demand response events. More specifically, the utility may be able to identify the correct number of demand response events to schedule and to identify the appropriate customers for receiving signals that are representative of initiating and/or implementing the events. Accordingly, a loss in revenue may be prevented for the utility and the customers may not endure the burden of receiving unnecessary signals.

Figure 1:
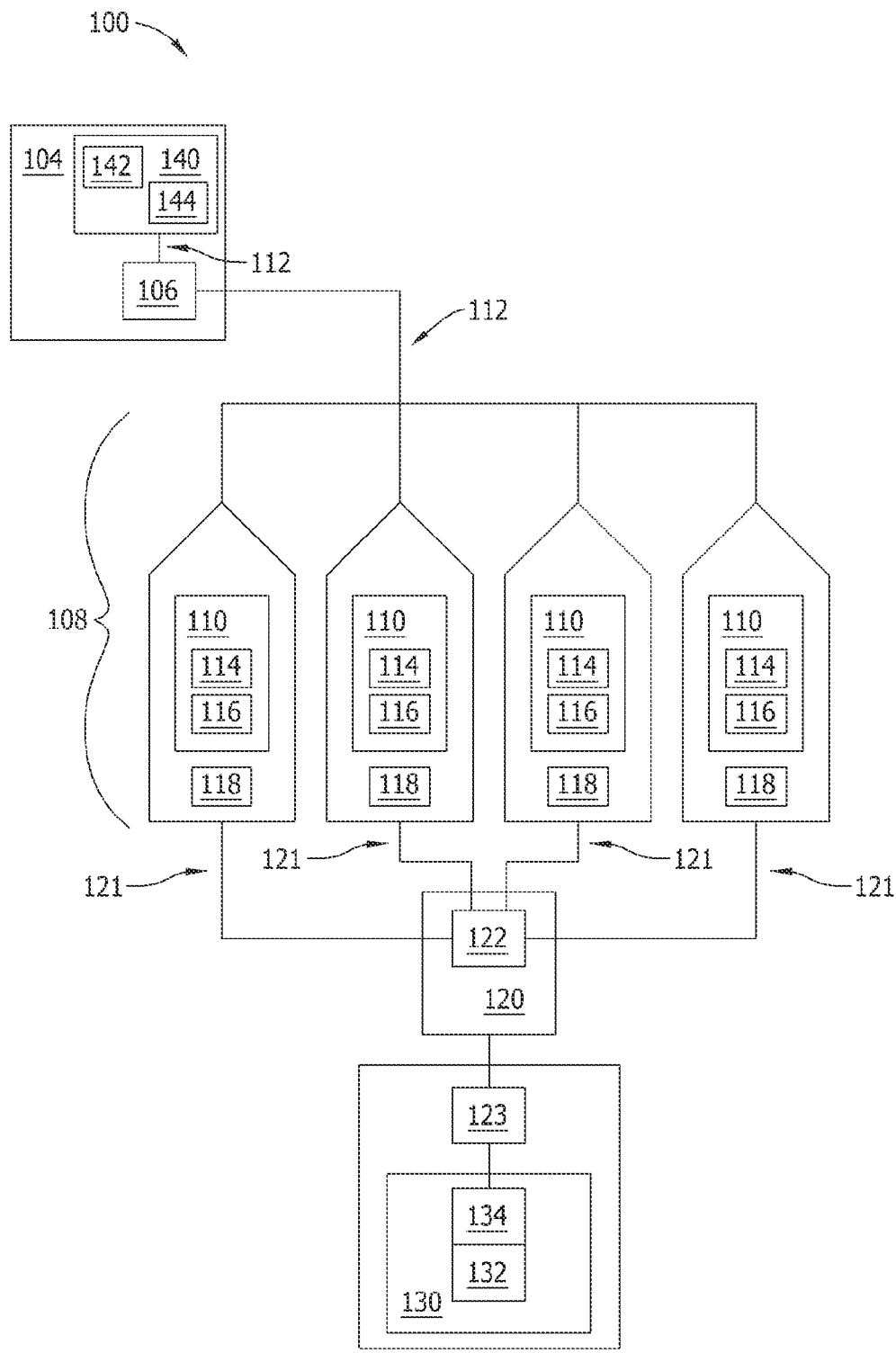
FIG. 1 is a block diagram of an exemplary demand response system.

FIG. 1 illustrates a demand response system 100. In the exemplary embodiment, demand response system 100 includes a utility 104 and a computing device 106 positioned within utility 104, wherein computing device 106 enables utility 104 to communicate with customers. Alternatively, computing device 106 may be positioned at another location with respect to utility 104. Moreover, in the exemplary embodiment, computing device 106 is communicatively coupled to a plurality of buildings 108, wherein a plurality of customers may reside. It should be noted that, as used herein, the term "couple" is not limited to a direct mechanical, electrical, and/or communication connection between components, but may also include an indirect mechanical, electrical, and/or communication connection between multiple components.

More specifically, in the exemplary embodiment, computing device 106 is communicatively coupled to at least one user notification device 110 within each building 108 via a network 112 such that computing device 106 may communicate with user notification device 110. In the exemplary embodiment, user notification device 110 may be a computer, a cellular phone, and/or a smart device, including a smart box and/or smart thermostat. Alternatively, user notification device 110 may be any other device that is configured to communicate with computing device 106. In the exemplary embodiment, each user notification device 110 is connected to network 112 and thus, each customer of utility 104 who is the owner and/or user of user notification device 110, has the same network location. Alternatively, each user notification device 110 may be connected to different networks.

Moreover, in the exemplary embodiment, each user notification device 110 includes a user interface 114 that receives at least one input from a user, such as a customer of utility 104. In the exemplary embodiment, user interface 114 may include, for example, a keyboard, a pointing device, a mouse, a stylus, a touch sensitive panel (e.g., a touch pad or a touch screen), a gyroscope, an accelerometer, a position detector, and/or an audio input interface (e.g., including a microphone) that enables the user to input pertinent information.

Moreover, in the exemplary embodiment, each user notification device 110 includes a presentation interface 116 that presents information, such as information regarding demand response programs and/or demand response events that are received from utility 104, input events and/or validation results, to the user. In the exemplary embodiment, presentation interface 116 includes a display adapter (not shown) that is coupled to at least one display device (not shown). More specifically, in the exemplary embodiment, the display device is a visual display device, such as a cathode ray tube (CRT), a liquid crystal display (LCD), an organic LED (OLED) display, and/or an "electronic ink" display. Alternatively, presentation interface 116 may include an audio output device (e.g., an audio adapter and/or a speaker) and/or a printer.

In the exemplary embodiment, computing device 106 may communicate with each user notification device 110 using a wired network connection (e.g., Ethernet or an optical fiber), a wireless communication means, such as radio frequency (RF), e.g., FM radio and/or digital audio broadcasting, an Institute of Electrical and Electronics Engineers (IEEE®) 802.11 standard (e.g., 802.11(g) or 802.11(n)), the Worldwide Interoperability for Microwave Access (WIMAX®) standard, a cellular phone technology (e.g., the Global Standard for Mobile communication (GSM)), a satellite communication link, and/or any other suitable communication means. WIMAX is a registered trademark of WiMax Forum, of Beaverton, Oreg. IEEE is a registered trademark of the Institute of Electrical and Electronics Engineers, Inc., of New York, N.Y. In the exemplary embodiment, user notification device 110 is configured to receive at least one signal from computing device 106 that may be representative of, for example, information related to at least one demand response program that a customer is enrolled in and/or that may be representative of a demand response event initiating and/or implementing the demand response program that the customer is enrolled in. In the exemplary embodiment, the demand response programs may include a direct load control program, a peak pricing program, such as a critical peak pricing program, and/or a time of use program.

In the exemplary embodiment, each building 108 also includes at least one machine 118. Each machine 118, in the exemplary embodiment, consumes energy, such as an appliance and/or a computer. User notification device 110 may or may not be coupled to machine 118. For example, if user notification device 110 is a smart device, then user notification device 110 may be coupled to machine 118, such as an appliance. Moreover, in the exemplary embodiment, each building 108 is coupled to a power distribution substation 120 via a plurality of conduits 121. In the exemplary embodiment, conduits 121 are fabricated from a metallic wire. Alternatively, conduits 121 may be fabricated from any other substance or compound that enables the distribution of electrical energy to each building 108.

More specifically, in the exemplary embodiment, substation 120 includes a grid 122 that is coupled to each building 108 and provides power to each building 108. In the exemplary embodiment, grid 122 is coupled to a generator 123 within a power generation system 124 that is operated by utility 104. In the exemplary embodiment, power generation system 124 includes a machine 130. Machine 130, in the exemplary embodiment, is a variable speed machine, such as a wind turbine, a hydroelectric steam turbine, a gas turbine, and/or any other machine that operates with a variable speed. Alternatively, machine 130 may be a synchronous speed machine. In the exemplary embodiment, machine 130 includes a rotating device 132, such as a rotor or other device. Moreover, in the exemplary embodiment, rotating device 132 rotates a drive shaft 134 that is coupled to generator 123.

In the exemplary embodiment, utility 104 also includes a data management system 140 that is coupled to computing device 106 via network 112. Alternatively, data management system 140 may be separate from utility 104. Data management system 140 may be any device capable of accessing network 112 including, without limitation, a desktop computer, a laptop computer, or other web-based connectable equipment. More specifically, in the exemplary embodiment, data management system 140 includes a database 142 that includes customer data for each of the customers of utility 104. In the exemplary embodiment, database 142 can be fully or partially implemented in a cloud computing environment such that data from the database is received from one or more computers (not shown) within utility 104 or remote from utility 104. In the exemplary embodiment, the customer data may include an enrollment status for each customer for participating in at least one demand response program. For example, the data may include a selection made by each customer for at least one demand response program to participate in. The customer data may also include at least one demand response program selected by each customer for each machine 118 to participate in. Moreover, in the exemplary embodiment, the customer data may include a participation history for each customer. The participation history may include, for example, the previous demand response events that each customer has participated in and the actual reduction in energy consumption that resulted from the participation in each of the events. The customer data may also include historical consumption values, such as energy consumption values, for each of the customers. The historical consumption values may include energy consumption values that result from participating in the previous demand response events. Database 142 may also include information, such as typical weather conditions and the types of demand response events that each customer participates in during different weather conditions.

Moreover, in the exemplary embodiment, data management system 140 includes a user interface 144 that receives at least one input from a user, such as an operator and/or employee of utility 104. In the exemplary embodiment, data management system user interface 144 may include, for example, a keyboard, a pointing device, a mouse, a stylus, a touch sensitive panel (e.g., a touch pad or a touch screen), a gyroscope, an accelerometer, a position detector, and/or an audio input interface (e.g., including a microphone) that enables the user to input pertinent information.

Data management system 140 may communicate with computing device 106 using a wired network connection (e.g., Ethernet or an optical fiber), a wireless communication means, such as radio frequency (RF), e.g., FM radio and/or digital audio broadcasting, an Institute of Electrical and Electronics Engineers (IEEE®) 802.11 standard (e.g., 802.11(g) or 802.11(n)), the Worldwide Interoperability for Microwave Access (WIMAX®) standard, a cellular phone technology (e.g., the Global Standard for Mobile communication (GSM)), a satellite communication link, and/or any other suitable communication means. More specifically, in the exemplary embodiment, data management system 140 transmits the customer data to computing device 106. While the customer data is shown as being stored in database 142 within data management system 140 in the exemplary embodiment, it should be noted that the customer data may be stored in another system and/or device. For example, computing device 106 may store the customer data therein.

During operation, utility 104 may transmit, for example, a questionnaire to its customers via computing device 106. The questionnaire provides questions to each customer to answer regarding the customer and the questionnaire provides various demand response programs that each customer may elect to participate in. More specifically, in the exemplary embodiment, the questionnaire is transmitted to user notification device 110. Each customer may input various responses to the questionnaire via user interface 114 within user notification device 110, including selecting at least one demand response program to participate in and/or selecting at least one demand response program for machine 118 to participate in. Alternatively, utility 104 may provide such a questionnaire to its customers via other means. For example, utility 104 may send the questionnaire via mail. Moreover, customers may provide responses for the questionnaire to utility 104 via other means, as opposed to via user notification device 110.

In the exemplary embodiment, if a customer provides his or her responses via user notification device 110, then the information that the customer provides is transmitted to computing device 106 via network 112. Computing device 106 then transmits the information to data management system 140, wherein the data is stored in database 142. If a customer provides his or her responses via other means, utility 104 may receive the information and a user, such as an employee of utility 104, may input the data to data management system 140 via data management system user interface 144, wherein the data may be stored in database 142.

When utility 104 needs to initiate and/or implement a demand response event, the user may input the initiation and/or implementation to computing device 106 at a particular time such that computing device 106 may transmit at least one signal representative of at least one demand response event to the customers identified by the user. Alternatively, computing device 106 may be programmed to select customers and may be programmed to transmit the signals representative of at least one demand response event at particular times of the day and/or days of the week. In either case, computing device 106 incrementally transmits a plurality of signals to each customer selected that are representative of at lease one demand response event. The signals may be transmitted to user notification device 110 such that each customer may receive the signal via presentation interface 116. Each customer may then choose whether to participate in the demand response event via user interface 114. Each time a customer participates in the demand response event, at least one signal representative of the participation and the actual reduction in energy consumption that resulted from the participation is transmitted to data management system 140 such that the participation history and/or the historical consumption values for each customer may be updated in database 142. Alternatively, the participation history and/or the historical consumption values for each customer may be updated in database 142 by a user via user interface 144.

As explained in more detail below, computing device 106, in the exemplary embodiment, enables utility 104 to accurately predict a reduction in energy consumption by its customers. In the exemplary embodiment, computing device 106 selects at least one customer of the plurality of customers for utility 104 based on the customer data, including the participation history and the historical consumption values. Computing device 106 then estimates the future reduction in energy consumption for the customer by considering the customer data. Computing device 106 then determines whether the estimated future reduction in energy consumption is substantially accurate.

By being able to accurately predict a future reduction in energy consumption by its customers, utility 104 can appropriately manage demand response events. More specifically, utility 104 may be able to identify the correct number of demand response events to schedule and to identify the appropriate customers for receiving signals initiating and/or implementing the events. As such, a loss in revenue may be prevented for utility 104, as only the appropriate number of signals will be transmitted by utility 104. Customers may also not endure the burden of receiving unnecessary signals, as only the customers who will likely participate in the event will be the ones who will likely be receiving the signals.

Figure 2:
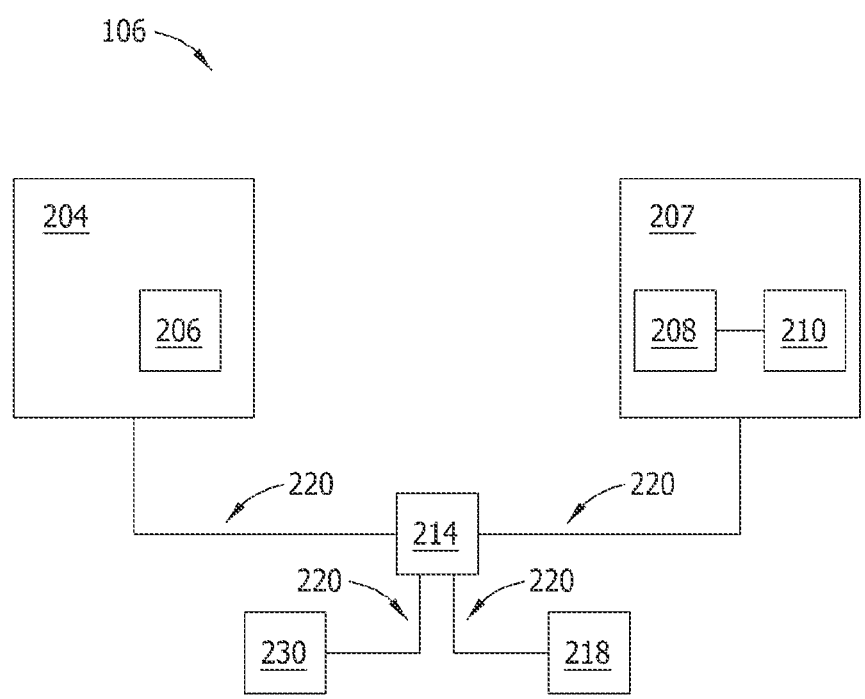
FIG. 2 is a block diagram of an exemplary computing device that may be used with the demand response system shown in FIG. 1.

FIG. 2 is a block diagram of computing device 106. In the exemplary embodiment, computing device 106 includes a user interface 204 that receives at least one input from a user, such as an operator and/or employee of utility 104 (shown in FIG. 1). In the exemplary embodiment, user interface 204 includes a keyboard 206 that enables the user to input pertinent information. Alternatively, user interface 204 may include, for example, a pointing device, a mouse, a stylus, a touch sensitive panel (e.g., a touch pad or a touch screen), a gyroscope, an accelerometer, a position detector, and/or an audio input interface (e.g., including a microphone).

Moreover, in the exemplary embodiment, computing device 106 includes a presentation interface 207 that presents information, such as input events and/or validation results, to the user. In the exemplary embodiment, presentation interface 207 includes a display adapter 208 that is coupled to at least one display device 210. More specifically, in the exemplary embodiment, display device 210 is a visual display device, such as a cathode ray tube (CRT), a liquid crystal display (LCD), an organic LED (OLED) display, and/or an "electronic ink" display. Alternatively, presentation interface 207 may include an audio output device (e.g., an audio adapter and/or a speaker) and/or a printer.

Computing device 106 also includes a processor 214 and a memory device 218. In the exemplary embodiment, processor 214 is coupled to user interface 204, presentation interface 207, and to memory device 218 via a system bus 220. In the exemplary embodiment, processor 214 communicates with the user, such as by prompting the user via presentation interface 207 and/or by receiving user inputs via user interface 204. Moreover, in the exemplary embodiment, processor 214 is programmed by encoding an operation using one or more executable instructions and providing the executable instructions in memory device 218. In the exemplary embodiment, processor 214 may be programmed to accurately predict the reduction of energy consumption for at least one customer of utility 104. More specifically, processor 214 may be programmed to select at least one customer of a plurality of customers by considering the customer data for each customer, such as the participation history and the historical consumption values for each customer. For example, processor 214 may be programmed to select the customer by identifying the customer who has a participation history for participating in at least three consecutive demand response events and/or the historical consumption values, such as the energy consumption values that correspond to the participation in demand response events. Alternatively, processor 214 may be programmed to select the customer by identifying the customer who has a participation history for participating in any number of demand response events and/or that enables computing device 106 to function as described herein.

In the exemplary embodiment, processor 214 is programmed to estimate the future reduction in energy consumption for the selected customer by considering the customer data, such as the type of demand response program that the customer is enrolled in and/or the customer has machine 118 (shown in FIG. 1) enrolled in, and/or the participation history for the customer and the historical consumption values, such as the previous demand response events the customer has participated in and the reduction in energy consumption that resulted from the participation. Processor 214 may also consider a total numeric value of customers that participate in a particular demand response event, consider typical weather conditions, and/or consider the types of demand response events that the customer participates in during different weather conditions.

Processor 214 is also programmed to determine whether the estimated future reduction in energy consumption for the customer is substantially accurate. Processor 214 is programmed to calculate an average of an actual reduction of energy consumption by the customer. For example, processor 214 may calculate an average of the actual reduction of energy consumption by the customer in the previous three demand response events the customer participated in. Processor 214 may then compare the estimated future reduction in energy consumption with the average of the actual reduction in energy consumption. Processor 214 may also be programmed to calculate a percentage of accuracy for the estimated future reduction in energy consumption determined for the customer. For example, when the estimated future reduction in energy consumption is greater than the average of the actual reduction in energy consumption, processor 214 may calculate the percentage of accuracy by dividing the estimated future reduction in energy consumption by the average of the actual reduction in energy consumption. Alternatively, when the estimated future reduction in energy consumption is less than the average of the actual reduction in energy consumption, processor 214 may calculate the percentage of accuracy by dividing the average of the actual reduction in energy consumption by the estimated future reduction in energy consumption.

The term "processor" refers generally to any programmable system including systems and microcontrollers, reduced instruction set circuits (RISC), application specific integrated circuits (ASIC), programmable logic circuits (PLC), and any other circuit or processor capable of executing the functions described herein. The above examples are exemplary only, and thus are not intended to limit in any way the definition and/or meaning of the term "processor."

In the exemplary embodiment, memory device 218 includes one or more devices that enable information, such as executable instructions and/or other data, to be stored and retrieved. Moreover, in the exemplary embodiment, memory device 218 includes one or more computer readable media, such as, without limitation, dynamic random access memory (DRAM), static random access memory (SRAM), a solid state disk, and/or a hard disk. In the exemplary embodiment, memory device 218 stores, without limitation, application source code, application object code, configuration data, additional input events, application states, assertion statements, validation results, and/or any other type of data. More specifically, in the exemplary embodiment, memory device 218 stores input data received by a user via user interface 204, and/or information received from other components of demand response system 100 (shown in FIG. 1), such as from user notification device 110 (shown in FIG. 1) and/or data management system 140 (shown in FIG. 1).

Computing device 106, in the exemplary embodiment, also includes a communication interface 230 that is coupled to processor 214 via system bus 220. Moreover, in the exemplary embodiment, communication interface 230 is communicatively coupled to user notification device 110 and data management system 140 via network 112 (shown in FIG. 1). In the exemplary embodiment, communication interface 230 communicates with user notification device 110, data management system 140, and/or other components within system 100.

During operation, when utility 104 needs to initiate and/or implement a demand response event, the user may input the initiation and/or implementation to computing device 106 at a particular time such that computing device 106 may transmit at least one signal representative of at least one demand response event to the customers identified by the user. Alternatively, computing device 106 may be programmed to select customers and may be programmed to transmit the signals representative of at least one demand response event at particular times of the day and/or days of the week. In either case, computing device 106 incrementally transmits a plurality of signals to each customer selected that are representative of at least one demand response event. The signals may be transmitted to user notification device 110 such that each customer may receive the signal via presentation interface 116. Each customer may then choose whether to participate in the demand response event via user interface 114. Each time a customer participates in the demand response event, at least one signal representative of the participation and the actual reduction in energy consumption that resulted from the participation is transmitted to data management system 140 such that the participation history and/or the historical consumption values for each customer may be updated in database 142 (shown in FIG. 1). Alternatively, the participation history and/or the historical consumption values for each customer may be updated in database 142 by a user via user interface 144 (shown in FIG. 1).

In the exemplary embodiment, computing device 106 enables utility 104 to accurately predict a future reduction in energy consumption by its customers. In the exemplary embodiment, a user, such as an employee of utility 104, may input a request to predict the reduction of energy consumption for some of the customers of utility 104 via user interface 204. The request is transmitted to processor 214, and a signal is transmitted to data management system 140. Customer data is then transmitted from database 142 to computing device 106. More specifically, communication interface 230 receives the customer data and transmits the data to processor 214. Processor 214 selects at least one customer of the plurality of customers for utility 104 by considering the customer data. For example, processor 214 may consider the participation history for each customer for participating in at least one demand response event and/or the historical consumption values. In the exemplary embodiment, processor 214 selects the customer by identifying the customer who has a participation history for participating in at least three consecutive demand response events and by identifying the historical consumption values that correspond to participation in the demand response events. Alternatively, processor 214 may select the customer by identifying the customer who has a participation history for participating in any number of demand response events. When the customer is selected, processor 214 identifies, from the customer data, an actual reduction in energy consumption for each of the times that the customer participated in the demand response events. Processor 214 then calculates an average of the actual reduction in energy consumption by the customer. For example, if the customer participated in three consecutive demand response events, then processor 214 would take the sum of the actual reduction in energy consumption for each of the three times that the customer participated in the demand response event and divide the sum of the actual reduction in energy consumption by three. In the exemplary embodiment, the name of the customer selected and/or the average of the actual reduction in energy consumption may be presented to the user via display device 210 within presentation interface 207.

Processor 214, in the exemplary embodiment, also estimates the future reduction in energy consumption for the selected customer by considering the customer data, such as the type of demand response program that the customer is enrolled and/or that the customer has machine 118 (shown in FIG. 1) enrolled in, and/or the participation history for the customer. For example, processor 214 may consider the previous demand response events the customer has participated in and the reduction in energy consumption that resulted from the participation. Processor 214 may also consider a total numeric value of customers that participate in a particular demand response event and/or consider typical weather conditions and/or the types of demand response events that the customer participates in during different weather conditions. In the exemplary embodiment, the estimated future reduction in energy consumption for the customer may be presented to the user via display device 210 within presentation interface 207.

Processor 214 then determines whether the estimated future reduction in energy consumption for the selected customer is substantially accurate. In the exemplary embodiment, processor 214 compares the estimated future reduction in energy consumption with the average of the actual reduction in energy consumption. If the estimated future reduction in energy consumption is greater than the average of the actual reduction in energy consumption, processor 214 calculates a percentage of accuracy by dividing the estimated future reduction in energy consumption by the average of the actual reduction in energy consumption. Alternatively, if the estimated future reduction in energy consumption is less than the average of the actual reduction in energy consumption, processor 214 may calculate the percentage of accuracy by dividing the average of the actual reduction in energy consumption by the estimated future reduction in energy consumption. In the exemplary embodiment, processor 214 may negate or not include values that are deemed outliers. Such values may include a value approximately equal to zero or values that are unrealistically or unusually high. If the percentage of accuracy is, for example, greater than approximately 0.75 or 75%, then the estimated future reduction in energy consumption for the customer is substantially accurate. Alternatively, if the percentage of accuracy is, for example, less than approximately 0.75 or 75%, then the estimated future reduction in energy consumption for the customer is not substantially accurate, and a customer bias value may be updated to provide more accurate estimations in the future. For example, a customer bias value may be in the range of 0.1 to 2.0, and the customer bias value may be multiplied by the percentage of error. In the exemplary embodiment, the percentage of accuracy may be presented to the user via display device 210 within presentation interface 207.

The user can then identify the correct number of demand response events to schedule and identify the appropriate customers for receiving signals initiating and/or implementing the events. For example, utility 104 may choose to only send signals to customers that will likely participate in a demand response event resulting in the most reduction of energy consumption.

Figure 3:
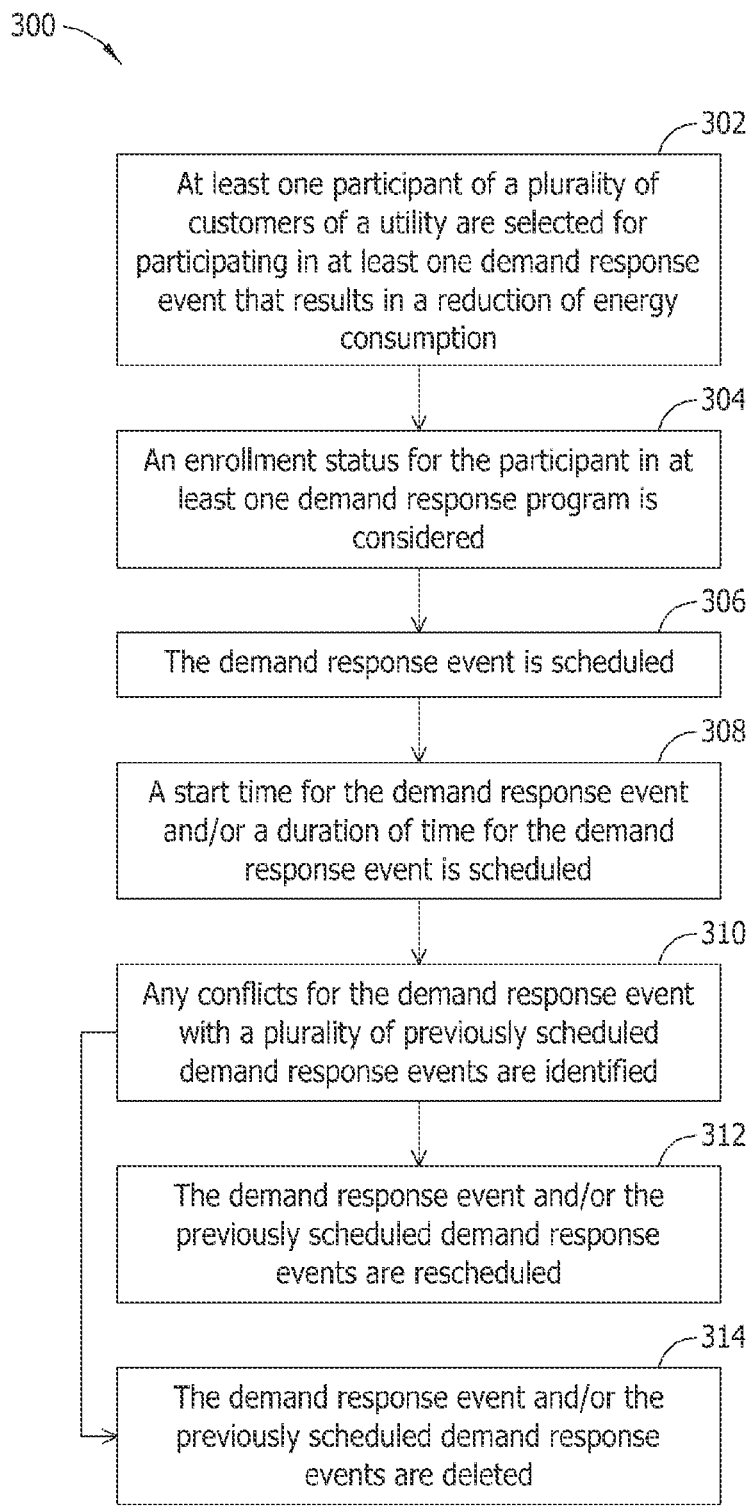
FIG. 3 is a flow chart of an exemplary method that may be used for predicting a reduction of energy consumption using the computing device shown in FIG. 2.

FIG. 3 is a flow chart of a method 300 that may be used for predicting a reduction of energy consumption using a computing device, such as computing device 106 (shown in FIGS. 1 and 2). Customer data of a plurality of customers of a utility 104 (shown in FIG. 1) is received 302 via a communication interface 230 (shown in FIG. 2), wherein the customer data includes a participation history and historical consumption values for each customer for participating in at least one demand response event that results in a reduction of energy consumption. The participation history and/or historical consumption values for each customer is updated 303 after each time that the customer participates in at least one demand response event.

At least one customer from the plurality of customers is selected 304, via a processor 214 (shown in FIG. 2), by considering the participation history and/or the historical consumption values for each of the customers. An average of an actual reduction of energy consumption by the customer is calculated 306 via processor 214. A future reduction in energy consumption for the customer is also estimated 308, via processor 214, and is based on the customer data. Whether the estimated future reduction in energy consumption is substantially accurate is then determined 310 via processor 214.

When the accuracy of the estimated future reduction in energy consumption is determined 310, the estimated future reduction in energy consumption is compared 312 with the average of the actual reduction in energy consumption. A percentage of accuracy is also calculated 314 for the estimated future reduction in energy consumption.

As compared to known demand response systems that are used to enable utilities to manage energy consumption by the implementation of demand response programs, the exemplary systems and methods described herein enable a utility to accurately predict a future reduction in energy consumption by its customers. The embodiments described herein include a demand response system that includes a computing device, wherein the computing device includes a communication interface for receiving customer data of a plurality of customers of a utility. The customer data includes a participation history and historical consumption values for each customer for participating in at least one demand response event. A processor is coupled to the communication interface and is programmed to select at least one customer of the plurality of customers by considering the participation history and the historical consumption values for each of the customers. The processor is also programmed to estimate a future reduction in energy consumption for the customer based on the customer data and to determine whether the estimated future reduction in energy consumption is substantially accurate. By being able to accurately predict a future reduction in energy consumption by its customers, the utility can effectively manage demand response events. More specifically, the utility may be able to identify the correct number of demand response events to schedule and to identify the appropriate customers for receiving signals that are representative of initiating and/or implementing the events. Accordingly, a loss in revenue may be prevented for the utility and the customers may not endure the burden of receiving unnecessary signals.

A technical effect of the systems and methods described herein includes at least one of: (a) receiving, via a communication interface, customer data of a plurality of customers of a utility, wherein the customer data includes a participation history and historical consumption values for each customer for participating in at least one demand response event; (b) selecting, via a processor, at least one customer of a plurality of customers by considering a participation history and historical consumption values for each of the customers; (c) estimating, via a processor, a future reduction in energy consumption for at least one customer based on customer data; and (d) determining, via a processor, whether an estimated future reduction in energy consumption is substantially accurate.

Exemplary embodiments of the systems and methods are described above in detail. The systems and methods are not limited to the specific embodiments described herein, but rather, components of the systems and/or steps of the methods may be utilized independently and separately from other components and/or steps described herein. For example, the systems may also be used in combination with other systems and methods, and is not limited to practice with only the systems as described herein. Rather, the exemplary embodiment can be implemented and utilized in connection with many other applications.

Although specific features of various embodiments of the invention may be shown in some drawings and not in others, this is for convenience only. In accordance with the principles of the invention, any feature of a drawing may be referenced and/or claimed in combination with any feature of any other drawing.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal language of the claims.

What is claimed is:

1. A demand response monitoring (DRM) computing device for use with a demand response system, said DRM computing device comprising:
   a communication interface configured to receive customer data for a plurality of customers, wherein the customer data includes a participation history for each customer that participated in at least one demand response event; and
   a processor coupled to a memory device and to said communication interface, said processor programmed to:
      select at least one customer from the plurality of customers based at least in part on the participation history for each of the customers; and
      estimate a future reduction in energy consumption for the at least one selected customer based on a total numeric value of customers that participate in a particular demand response event, typical weather conditions, and types of demand response events that the at least one selected customer participates in during different weather conditions.

2. A DRM computing device in accordance with claim 1, wherein said processor is further programmed to:
   determine whether the estimated future reduction in energy consumption is substantially accurate; and
   calculate an average of an actual reduction of energy consumption by the at least one selected customer.

3. A DRM computing device in accordance with claim 2, wherein said processor is programmed to determine whether the estimated future reduction in energy consumption is substantially accurate by comparing the estimated future reduction in energy consumption with the average of the actual reduction in energy consumption.

4. A DRM computing device in accordance with claim 3, wherein said processor is further programmed to calculate a percentage of accuracy for the estimated future reduction in energy consumption.

5. A DRM computing device in accordance with claim 1, wherein said communication interface receives customer data that includes an updated participation history.

6. A DRM computing device in accordance with claim 1, wherein said processor is programmed to select at least one customer by identifying at least one of the participation history that includes participating in at least three demand response events and historical consumption values that correspond to the participation in the at least three demand response events.

7. A DRM computing device in accordance with claim 1, wherein said processor is programmed to estimate the future reduction in energy consumption by considering at least one of a type of at least one demand response program that the at least one selected customer is enrolled in, the participation history for the at least one selected customer, a total numeric value of the customers that participated in the at least one demand response event, and current and forecast weather conditions.

8. A demand response system comprising:
   a data management system comprising a database that includes customer data for a plurality of customers, wherein the customer data includes a participation history for each customer that participated in at least one demand response event; and
   a demand response monitoring (DRM) computing device coupled to said data management system, said DRM computing device comprising:
      a communication interface configured to receive the customer data;
      a processor coupled a memory and to said communication interface, said processor programmed to:
         select at least one customer from the plurality of customers by considering the participation history for each of the customers; and
         estimate a future reduction in energy consumption for the at least one selected customer based on a total numeric value of customers that participate in a particular demand response event, typical weather conditions, and types of demand response events that the at least one selected customer participates in during different weather conditions.

9. A demand response system in accordance with claim 8, wherein said processor is further programmed to:
   determine whether the estimated future reduction in energy consumption is substantially accurate; and
   calculate an average of an actual reduction of energy consumption by the at least one selected customer.

10. A demand response system in accordance with claim 9, wherein said processor is programmed to determine whether the estimated future reduction in energy consumption is substantially accurate by comparing the estimated future reduction in energy consumption with the average of the actual reduction in energy consumption.

11. A demand response system in accordance with claim 10, wherein said processor further programmed to calculate a percentage of accuracy for the estimated future reduction in energy consumption.

12. A demand response system in accordance with claim 8, wherein said communication interface receives customer data that includes an updated participation history.

13. A demand response system in accordance with claim 8, wherein said processor is programmed to select at least one customer by identifying at least one of the participation history that includes participating in at least three demand response events and the historical consumption values that correspond to the participation in the at least three demand response events.

14. A demand response system in accordance with claim 8, wherein said processor is programmed to estimate the future reduction in energy consumption by considering at least one of a type of at least one demand response program that the at least one selected customer is enrolled in, the participation history for the at least one selected customer, a total numeric value of the customers that participated in the at least one demand response event, and current and forecast weather conditions.

15. A computer-implemented method for predicting a reduction of energy consumption, said method implemented using a processor in communication with a memory, said method comprising:
   receiving customer data for a plurality of customers, wherein the customer data includes a participation history for each customer for that participated in at least one demand response event;
   selecting at least one customer from the plurality of customers by considering the participation history for each of the customers; and
   estimating a future reduction in energy consumption for the at least one selected customer based on a total numeric value of customers that participate in a particular demand response event, typical weather conditions, and types of demand response events that the at least one selected customer participates in during different weather conditions.

16. A method in accordance with claim 15, further comprising:
   determining, via the processor, whether the estimated future reduction in energy consumption is substantially accurate; and
   calculating, via the processor, an average of an actual reduction of energy consumption by the at least one selected customer.

17. A method in accordance with claim 16, wherein determining, via the processor, whether the estimated future reduction in energy consumption is substantially accurate further comprises determining, via the processor, whether the estimated future reduction in energy consumption is substantially accurate by comparing the estimated future reduction in energy consumption with the average of the actual reduction in energy consumption.

18. A method in accordance with claim 17, wherein determining, via the processor, whether the estimated future reduction in energy consumption is substantially accurate further comprises determining, via the processor, whether the estimated future reduction in energy consumption is substantially accurate by calculating a percentage of accuracy for the estimated future reduction in energy consumption.

19. A method in accordance with claim 15, wherein selecting, via a processor, at least one customer of the plurality of customers further comprises selecting, via a processor, at least one customer of the plurality of customers by identifying at least one of the participation history that includes participating in at least three demand response events and the historical consumption values that correspond to the participation in the at least three demand response events.

* * * * *